Aug. 7, 1934. C. L. SNYDER 1,969,434
AUTOMOBILE SHIPPING CAR
Filed May 4, 1931 2 Sheets-Sheet 1
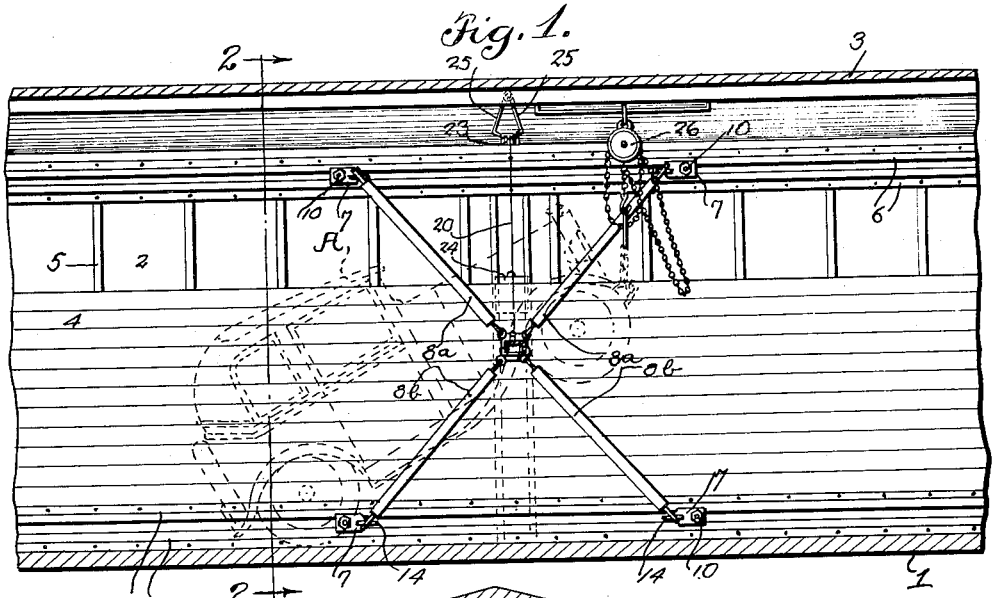
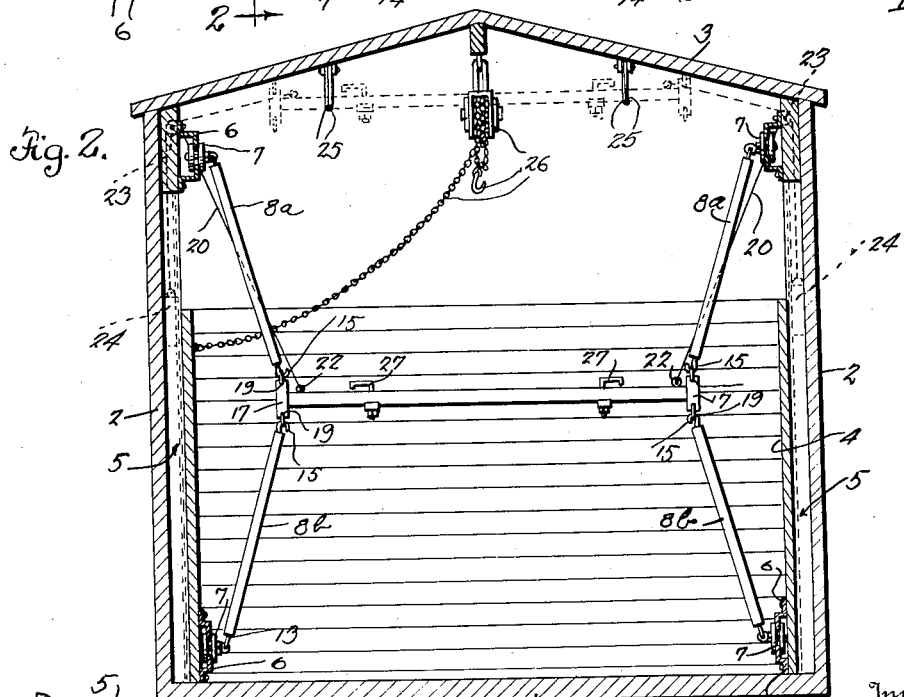
Inventor
Clifford L. Snyder.
By 
Attorney Aug. 7, 1934.           C. L. SNYDER           1,969,434
AUTOMOBILE SHIPPING CAR
Filed May 4, 1931           2 Sheets-Sheet 2
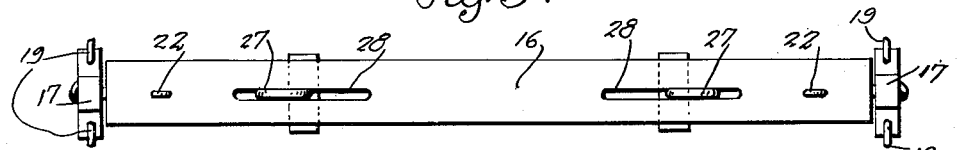
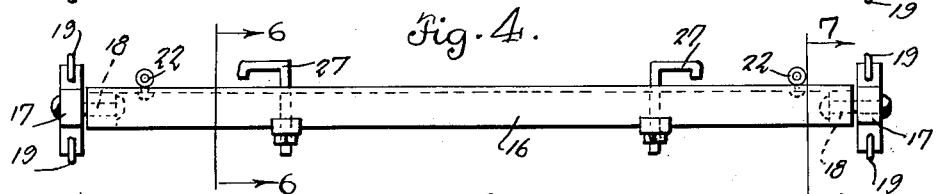
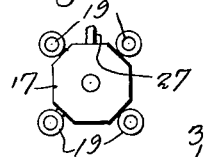
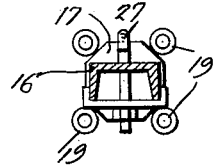
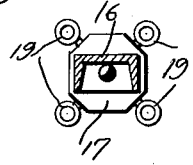
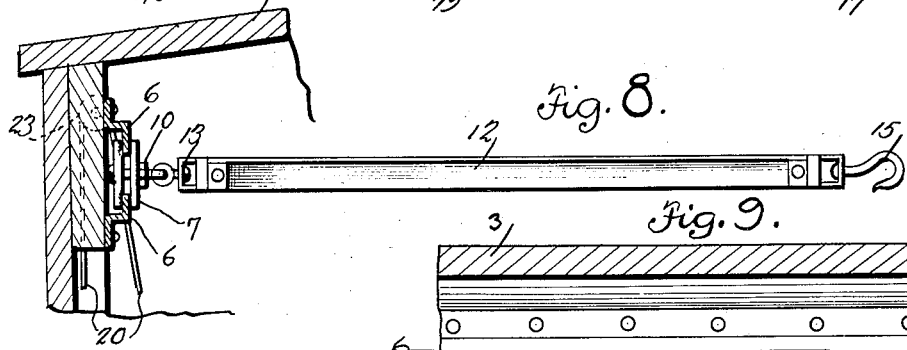
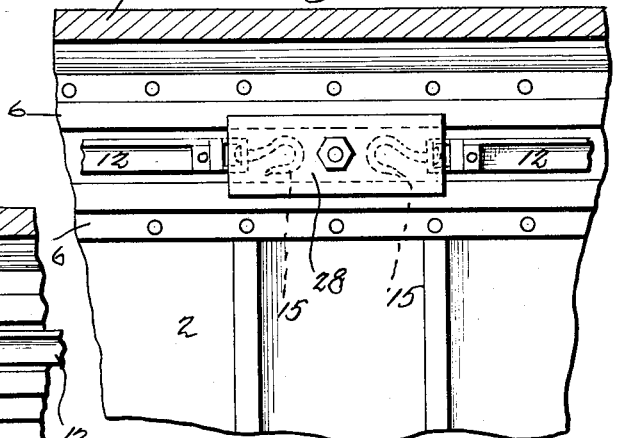
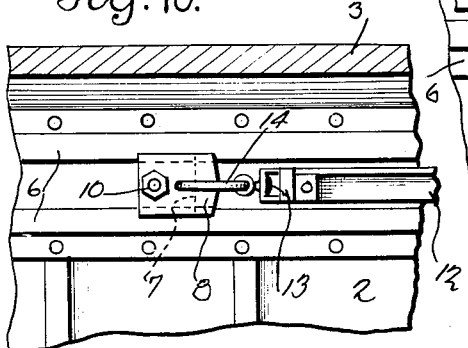
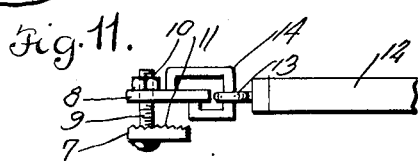
Inventor
Clifford L. Snyder.
By P. L. Bryant
Attorney Patented Aug. 7, 1934

1,969,434

UNITED STATES PATENT OFFICE 1,969,434

AUTOMOBILE SHIPPING CAR

Clifford L. Snyder, Detroit, Mich., assignor, by mesne assignments, to The Worth Company, a corporation of Michigan Application May 4, 1931, Serial No. 535,038

3 Claims. (Cl. 105—368)

This invention relates to certain new and useful improvements in automobile shipping cars.

The primary object of the invention is to provide an automobile shipping car wherein the car is equipped with mechanism shiftable to a position desired and designed for the support of an automobile in semi-decked position and eliminating the use of the usual supporting devices engaged with the axle ends that required removal of the automobile wheels.

A further object of the invention is to provide automobile shipping equipment of the foregoing character wherein a cross bar or channel is adapted to be placed in supporting engagement with the underside of the chassis of an automobile with hanger members engaged with the ends of the cross bar and shiftably supported at their upper ends on a part of the car structure with brace members depending from the ends of the cross bar and adjustably engaged at their lower ends with a part of the car, the elevated end of the automobile being supported upon the cross bar and secured thereto while the lower end of the automobile may be anchored by chock blocks or the like.

A still further object of the invention is to provide shipping apparatus for automobiles embodying hangers and brace members of the type hereinbefore described, wherein the cross bar for the support of the automobile is disengaged from the hangers and brake members when the apparatus is out of use to be moved to a position adjacent the car roof while the shiftable supports for the ends of the hangers and brace members are movable to permit aligning of the hangers and brace members adjacent the carrying part of the car to be out of the way when the apparatus is out of use.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary vertical longitudinal sectional view of an automobile shipping car constructed in accordance with the present invention and illustrating the devices for the support of an automobile, the latter being illustrated in dotted lines in semi-decked position;

Figure 2 is a vertical cross-sectional view taken on line 2—2 of Figure 1, showing the supporting devices for the automobile with the cross bar for the support of the automobile illustrated by dotted lines in its elevated inoperative position;

Figure 3 is a top plan view of the automobile supporting cross-bar disengaged from the hangers and brace members showing the adjustable clamp carried by the bar to be engaged by the underside of the chassis of the automobile;

Figure 4 is a side elevational view of the cross-bar showing the swiveled heads at the ends thereof to which the hangers and brace members are attached;

Figure 5 is an end elevational view of the cross-bar;

Figure 6 is a cross-sectional view taken on line 6—6 of Figure 4, showing the cross bar to be of channel formation;

Figure 7 is a cross-sectional view taken on line 7—7 of Figure 4;

Figure 8 is a detail sectional view of a part of a car structure showing a hanger or brace member attached thereto at one end, the latter being shown in side elevation;

Figure 9 is a fragmentary elevational view, partly in section of a part of the car structure, showing the means for confining the hanger in inoperative position when not in use;

Figure 10 is a fragmentary elevational view, partly in section showing the sliding support for the attached end of a hanger;

Figure 11 is an edge elevational view of the support for the hanger disengaged from the track guide; and Figure 12 is a detail sectional view showing a guide for a lower brace member set into the floor of the car.

The first car that is equipped with devices for supporting an automobile during shipment comprises a floor 1, side walls 2, a roof section 3 and the usual end walls, inner panelling 4 being provided in spaced relation to the walls by the side channels 5 for purposes presently to appear.

Cooperating rails forming channel guides are preferably carried by the upper and lower edges of the side walls 2 and panelling 4, running lengthwise of the car, although it is to be understood that the channel guides may well be supported upon the roof 3 of the car and the floor 1 as indicated in Figure 12, the channel guides as shown in Figures 1, 2, and 8 to 10 being comprised of Z-rails 6 having adjacent edges thereof spaced forming guide slots through which adjustable clamp members extend. Clamp members are adjustably slidable in the upper and lower channel guides, the upper clamp members having hangers attached thereto, while the lower clamp members have brace arms attached thereto, the clamp member as shown in Figure 11 comprising a pair of plates 7 and 8 arranged at the inner and outer sides respectively of the adjacent edges of the Z-rails 6 and a headed screw pin 9 passing through the plates while the nut 10 threaded upon the pin 9 retains the plates 7 and 8 assembled and also operates to move the plates into binding engagement with the Z-rails, the inner face of the plate 7 being serrated or roughened as at 11 to provide a better gripping surface. The hangers and brace members are of identical construction and comprise rods 12 having a swivel connection 13 at one end with the keeper loop 14 carried by the plate 8 of the clamping member while a hook 15 is swiveled to the other end of each rod 12. It is to be understood that cables or chains may be substituted for the rods 12 of the hanger and brace members.

The hanger and brace members are adapted to be engaged with an automobile supporting cross bar 16, preferably of channel formation in cross section as shown in Figs. 6 and 7 with a head 17 traversing each end of the cross bar and swiveled thereto as at 18, a plurality of eyes 19 being carried by each head 17 for reception of the hooks 15 upon the hangers and brace members as shown in Figures 1 and 2. When the hangers and brace members are disengaged from the cross bar 16, the latter is supported by a cable 20 arranged at each side of the car with one end thereof attached to the eye 22 carried by each end of the cross bar, the cable passing over the guide pulley 23 and carrying upon its other end a counterweight 24 that depends into the side channels 5 of the car. When the supporting structure is out of use, the cross bar 16 is elevated to the dotted line position shown in Figure 2 adjacent the roof 3 of the car and is there retained by hook members 25 carried by the car roof as shown in Figures 1 and 2.

A chain fall 26 suspended centrally from the roof 3 of the car is employed for elevating one end of the automobile A into the dotted line position illustrated in Figure 1, and at which time cross-bar 16 is disposed beneath the chassis of the automobile and is locked to the chassis by clamp arms 27 carried by the cross bar and adjustable through slots 28. The hooked ends 15 of the rods 8 that form the hangers 8a and brace members 8b as shown in Figures 1 and 2 are then engaged with the heads 17 upon the ends of the cross bar and the clamping members associated with the channel guide and comprising the plates 7 and 8 are moved into binding engagement with the channel guide for securely anchoring the automobile in semi-decked condition. The lower end of the automobile may be supported in any convenient manner, such as by the use of chock blocks or the like engaged with the wheels thereof.

It has been stated that the channel guide for the clamping members may be carried by the side walls, roof or floor of the car and as shown in Figure 12, a longitudinally slotted plate 6a is set into the car floor 1 with which plate the clamping member is associated.

When the apparatus is out of use, the same is moved to remote position to give free access to the interior of the car, the hangers and brace members 8a and 8b being disengaged from the cross bar 16, the latter then assuming a position adjacent the roof 3 of the car as previously described and there retained by the hooks 24 while the hangers and brace members are moved upon their swivel connections 13 with the clamping members to occupy positions within the channel guide as shown in Figures 9 and 10, a retaining plate 28 being provided to overlie the hooked ends 15 of the hanger and brace member rods 12 and retain them in the channel guide. The several parts of the apparatus are easily and quickly dis-assembled and shifted to positions when out of use to present an uninterrupted area within the car and the apparatus is easily and quickly assembled for the support of an automobile without the necessity of removing the wheels from the automobile, the elevation of the semi-decked automobile being controlled by the shiftable clamp members.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

I claim:—

1. The combination with a car, of vertically spaced guide channels extending longitudinally at opposite sides thereof, a cross bar for the support of an automobile, hangers and brace members extending respectively between the ends of the cross bar and the vertically spaced channel guides, detachably connected to the cross bar, said hangers and brace members being movable into the channel guides when out of use, and means to retain the hangers and brace members in the channel guides.

2. The combination with a car, of vertically spaced guide channels extending longitudinally at opposite sides thereof, a cross bar for the support of an automobile, hangers and brace members extending between the ends of the cross bar and the vertically spaced channel guides detachably connected to the cross bar, counter-balance supporting means for the cross bar when the hangers and brace members are disengaged therefrom, said hangers and brace members being movable into the channel guides when out of use.

3. In an automobile shipping car, a car having vertically spaced channel guides extending lengthwise at opposite sides thereof, clamp members adjustably shiftable in the guides, hangers and brace members respectively swivelled to the vertically spaced clamp members, a cross bar detachably engaged with the free ends of the hanger and brace members, said hangers and brace members at the vertically spaced channel guides being alined and received in the guides when out of use, and means for retaining the hangers and brace members in the guides.

CLIFFORD L. SNYDER.